United States Patent
Prasad et al.

(10) Patent No.: US 10,501,692 B2
(45) Date of Patent: Dec. 10, 2019

(54) DELAYED COKER DRUM AND METHOD OF OPERATING THEREOF

(71) Applicant: Indian Oil Corporation Limited, Bandra (East), Mumbai (IN)

(72) Inventors: Terapalli Hari Venkata Devi Prasad, Faridabad (IN); Ponoly Ramachandran Pradeep, Faridabad (IN); Satyen Kumar Das, Faridabad (IN); Jagdev Kumar Dixit, Faridabad (IN); Rajesh, Faridabad (IN); Gautam Thapa, Faridabad (IN); Debasis Bhattacharyya, Faridabad (IN); Sankara Sri Venkata Ramakumar, Haryana (IN); Biswapriya Das, Haryana (IN)

(73) Assignee: INDIAN OIL CORPORATION LIMITED (IN)

( * ) Notice: Subject to any disclaimer, the term of this patent is extended or adjusted under 35 U.S.C. 154(b) by 0 days.

(21) Appl. No.: 15/650,587

(22) Filed: Jul. 14, 2017

(65) Prior Publication Data

US 2018/0016503 A1  Jan. 18, 2018

(30) Foreign Application Priority Data

Jul. 15, 2016 (IN) .............................. 201621024302

(51) Int. Cl.
| | | |
|---|---|---|
| *C10B 33/00* | (2006.01) | |
| *C10B 1/04* | (2006.01) | |
| *B01J 19/00* | (2006.01) | |
| *C10B 55/02* | (2006.01) | |
| *C10B 55/00* | (2006.01) | |
| *C10G 1/08* | (2006.01) | |

(52) U.S. Cl.
CPC ........... *C10B 33/00* (2013.01); *B01J 19/0053* (2013.01); *C10B 1/04* (2013.01); *C10B 55/00* (2013.01); *C10B 55/02* (2013.01); *C10G 1/086* (2013.01)

(58) Field of Classification Search
CPC ......... C10B 33/00; C10B 57/18; C10B 55/02; C10B 1/04; C10B 55/00; B01J 8/44; B01J 19/0053; C10G 51/04; C10G 70/00; C10G 9/005; C10G 1/086
See application file for complete search history.

(56) References Cited

U.S. PATENT DOCUMENTS

| | | | |
|---|---|---|---|
| 2,888,393 A * | 5/1959 | Ballard | ................ C10G 49/007 |
| | | | 208/53 |
| 2,888,395 A | 5/1959 | Henny | |
| 3,619,413 A | 11/1971 | Folkins | |
| 3,775,294 A * | 11/1973 | Peterson et al. | ......... C10B 55/00 |
| | | | 208/89 |
| 4,169,041 A | 9/1979 | Schuette | |
| 2010/0170827 A1 | 7/2010 | Etter | |

* cited by examiner

*Primary Examiner* — Randy Boyer
*Assistant Examiner* — Juan C Valencia
(74) *Attorney, Agent, or Firm* — Workman Nydegger; Carl T. Reed

(57) ABSTRACT

The present subject matter describes a method and apparatus for operating a delayed coker. The method comprises contacting a vapour produced in a delayed coker-drum with a catalyst maintained in form of a bed, and maintaining a level of said catalyst-bed within pre-defined limits during catalytic-cracking of the vapour. Thereafter, the cracked-vapour is routed to a coker-fractionator column to trigger conversion into one or more hydrocarbon products.

5 Claims, 7 Drawing Sheets

(a) (b)

DELAYED COKER DRUM AND METHOD OF OPERATING THEREOF

TECHNICAL FIELD

The subject matter relates to a delayed-coker drum to crack petroleum residue and in particular relates to catalytic-cracking inside the delayed-coker drum.

BACKGROUND

Worldwide, refiners have increased the amount of processing heavier crudes in their crude basket due to availability at cheaper cost. These crudes contain higher proportion of heavier fractions containing higher quantity of large amounts of aromatics such as asphatlenes and resins and impurities such as sulfur, nitrogen, nickel, vanadium, sodium. The heavier fractions cannot be economically distilled or catalytically cracked due to high coke make and catalyst deactivation by ash and metals. The heavier fractions are normally processed in conventional Delayed Coking process to convert low value heavy residuum to valuable distillates. As a result, the generation of fuel oil is much higher and available in surplus quantity. In most cases, fuel oil is economically the least desirable product for the refiner, upgrading the fuel oil to further valuable middle distillates and gaseous products in the conventional Delayed Coking process will certainly improve the refinery margins.

U.S. Pat. No. 3,619,413 describes a delayed coking process in which small amounts of hydrogen halide or hydrocarbyl halides are added to the heated feed to the coke drums. The addition of such halides is alleged to make the volatile content of the coke more uniform without affecting the distillate yield adversely.

U.S. Pat. No. 4,169,041 describes a fluid hydrocoking process in which metallic hydrogenation catalysts, particularly molybdenum, chromium, and vanadium are added to the fluid coking feedstock. The addition of such metals is reported to increase distillate yield and reduce coke yield. U.S. Pat. Nos. 2,888,393 and 2,888,395 also teach the use of hydrogen and hydrogen plus catalyst, respectively, in fluid coking.

US Patent US 2010/0170827A1 describes a process for improving yield of desired products from Delayed coking process by supplying a catalyst material in the top section of the drum, which falls into the liquid pool inside the coke drum, which during its downward motion, contacts the product vapors and catalytically cracks the same to lighter material. But, here the major disadvantage is that the whole of the catalyst material is settled inside the liquid pool inside the coke drum and gets deposited in the solid petroleum coke formed during the thermal cracking of feedstock. This necessarily increases the 'ash content' of the coke that is produced from the process, making the coke out of specifications of the coke customers.

The control over vapor-catalyst contact time is limited by the gravity fall of the catalyst particles through the drum and also the contact time of catalyst particles with the product vapors will vary throughout the coke drum filling cycle, since the height of liquid pool increases throughout the cycle with increased quantities of feed is supplied to the drum.

Therefore, it is desirable to have a process which overcomes the above stated drawbacks in the prior art to facilitate the refiner to effectively utilize a catalyst for improving the yield pattern from the delayed coking process. The present subject matter attempts to provide an alternate process and apparatus to address these issues.

OBJECT

It is the primary objective of the subject matter is to provide a delayed Coking of heavy petroleum residue producing petroleum coke and lighter hydrocarbon products.

It is the further objective of the subject matter is to make use of (1) an in-situ catalytic reactor bed as a part of the Delayed Coker drum after the thermal cracking reaction zone (2) an external swing bed catalytic reactor bed in either fluidized or packed bed operation to increase the hydrocarbon conversion to lighter products.

It is the further objective of the subject matter is to utilize a catalytic reactor bed after the thermal cracking zone, either inside or outside the coke drums to minimize the issue of coke quality deterioration thereby decrease of ash content.

SUMMARY

This summary is provided to introduce a selection of concepts in a simplified version form that are further described below in the detailed description. This summary is not intended to identify key features or essential features of the present subject matter, nor is it intended as an aid in determining the scope thereof.

According to an embodiment of the present subject matter, a method and system for operating a delayed coker drum has been described. The method comprises contacting a vapour produced in a delayed coker-drum with a catalyst maintained in form of a bed, and maintaining a level of said catalyst-bed within pre-defined limits during catalytic-cracking of the vapour. Thereafter, the cracked-vapour is routed to a coker-fractionator column to trigger conversion into one or more hydrocarbon products.

In distinction to the prior art processes, the present subject matter provides a process for conversion of heavy residue hydrocarbons vide a thermal cracking process facilitated by use of a catalytic bed. In accordance with the subject matter, the hydrocarbon product vapors from the thermal cracking zone inside the coke drum are further contacted by the catalysts under the operation conditions of temperature range 400° C. to 500° C., pressure range of 0.5 to 5 $kg/cm^2g$ and W/F ratio (Weight of catalyst/Rate of vapor flow) range of 0.02-0.8 located in the in-situ stationary or moving fluidized bed or an external wing bed for further conversion to lighter hydrocarbon products. Regeneration of spent catalyst is carried out either offline or online depending on the scheme in the presence of air and or oxygen containing gases at a temperature range of 600° C. to 700° C. and provides a regenerated catalyst with a coke content of less than 0.03 wt % for reuse.

BRIEF DESCRIPTION OF THE DRAWINGS

To further clarify advantages and features of the present subject matter, a more particular description of the subject matter will be rendered by reference to specific embodiments thereof, which is illustrated in the appended drawings. It is appreciated that these drawings depict only typical embodiments of the subject matter and are therefore not to be considered limiting of its scope. The subject matter will be described and explained with additional specificity and detail with the accompanying drawings.

DETAILED-DESCRIPTION OF THE DRAWINGS

Figure 1:
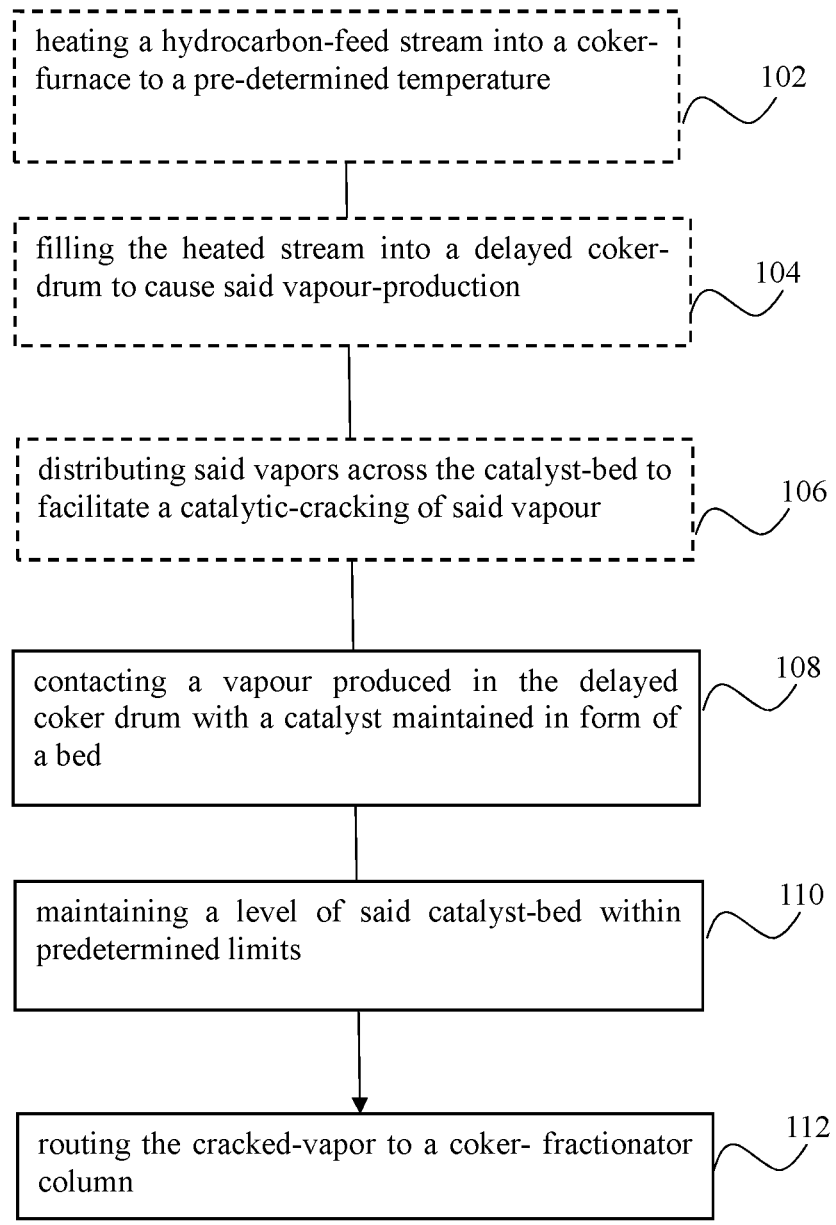
FIG. 1 describes a process in accordance with an embodiment of the present subject matter.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

A schematic method in accordance with the present subject-matter has been depicted as FIG. 1. The method comprises heating (step 102) a hydrocarbon-feed stream into a coker-furnace till a pre-determined temperature. The heated stream is filled (step 104) into a delayed coker-drum for triggering a delayed coking process to cause a vapour-production. Thereafter, the method comprises distributing (step 106) said vapors so produced within the coker-drum across a catalyst-bed to facilitate a catalytic-cracking of said vapour through said catalyst-bed located around the exit of the coker-drum. The catalyst-bed may be at-least one of: a fluidized bed, a moving bed, a circulating fluidized bed, and a packed bed.

Thereafter, the vapour produced in the delayed-coker drum is contacted (step 108) with a catalyst maintained in form of the bed within the coker-drum. Further, a level of the catalyst-bed is maintained (step 110) within pre-defined limits during catalytic-cracking of the vapour. Such maintenance of catalyst-bed refers to maintaining the catalyst-bed's height within the pre-defined limits to prevent an escape of catalyst particles alongside the cracked vapour and attain a pre-defined pressure drop in respect of said catalyst-bed.

In another embodiment, the maintenance of catalyst bed also comprises maintaining the catalyst-bed outside the delayed coker-drum in at least one separate chamber. The spent-catalyst from the catalyst-bed may be operated upon to remove entrained hydrocarbon-vapor and/or regenerate the catalyst.

In yet another embodiment, the maintenance of catalyst bed also comprises maintaining the catalyst-bed as a moving bed. Such moving catalyst bed is withdrawn as a spent-catalyst and communicated to a stripper vessel. The spent-catalyst is then operated upon to remove entrained hydrocarbon-vapor through the stripper vessel and/or regenerate the catalyst in the regenerator. The regenerated catalyst is then transported from a regenerator back to the catalyst-bed.

Finally, the cracked vapor is then routed (step 112) to a coker-fractionator column to trigger conversion into one or more hydrocarbon products. In an example, the hydrocarbon products may be naphtha, kerosene, etc may be finally obtained through the coker-fractionator column.

The process of the present subject matter is exemplified by, but not limited to the forthcoming description. The liquid hydrocarbon feedstock to be used in the process can be selected from heavy hydrocarbon feedstocks like vacuum residue, atmospheric residue, deasphalted pitch, shale oil, coal tar, clarified oil, residual oils, heavy waxy distillates, foots oil, slop oil or blends of such hydrocarbons. The Conradson carbon residue content of the feedstock can be above 4 wt % and density can be minimum of 0.95 g/cc.

Coke drums may be operated at a higher severity with desired operating temperature ranging from 470 to 520° C., preferably between 480° C. to 500° C. and desired operating pressure ranging from 0.5 to 5 $Kg/cm^2$ (g) preferably between 0.6 to 3 $Kg/cm^2$ (g). The residence time provided in coke drums is more than 10 hours.

In the process of the present subject matter, the catalyst may be selected from a range of catalysts enabling cracking reactions through carbenium ion mechanism. The catalyst may contain large pore bottom cracking matrix based materials, pentasil zeolite, Y-zeolite, Re-Y zeolites, HZSM-5, USY-zeolite etc. the catalyst may be selected based on the desired yield improvement expected from the thermal cracking reaction products. Catalyst may be micronized particles of the average particle size in the range of 75-100 microns, with content of fines to the minimum, to prevent entrainment. Catalyst particles may be designed so that they are in the category 'A' of Geldart fluidization chart, as known to those with expertise in the art of fluidization. The catalyst may be a fresh catalyst, Ecat from refinery process units, with optional use of spent catalyst as a part of the catalyst mixture.

The catalytic reactor bed can have operating temperature ranging from 400 to 500° C., preferably between 420° C. to 480° C. and desired operating pressure ranging from 0.5 to 5 Kg/cm$^2$ (g) preferably between 0.6 to 3 Kg/cm$^2$ (g). The quantity of catalyst being maintained inside the bed may be according to the W/F ratio (Weight of catalyst/Rate of vapor flow), which may vary from 0.02-0.8. Catalyst bed may be a bubbling fluidized bed or a moving bed or a packed bed. The height of the catalyst bed can be determined by the catalyst-vapor contact time as well as by entrainment considerations.

Figure 2:
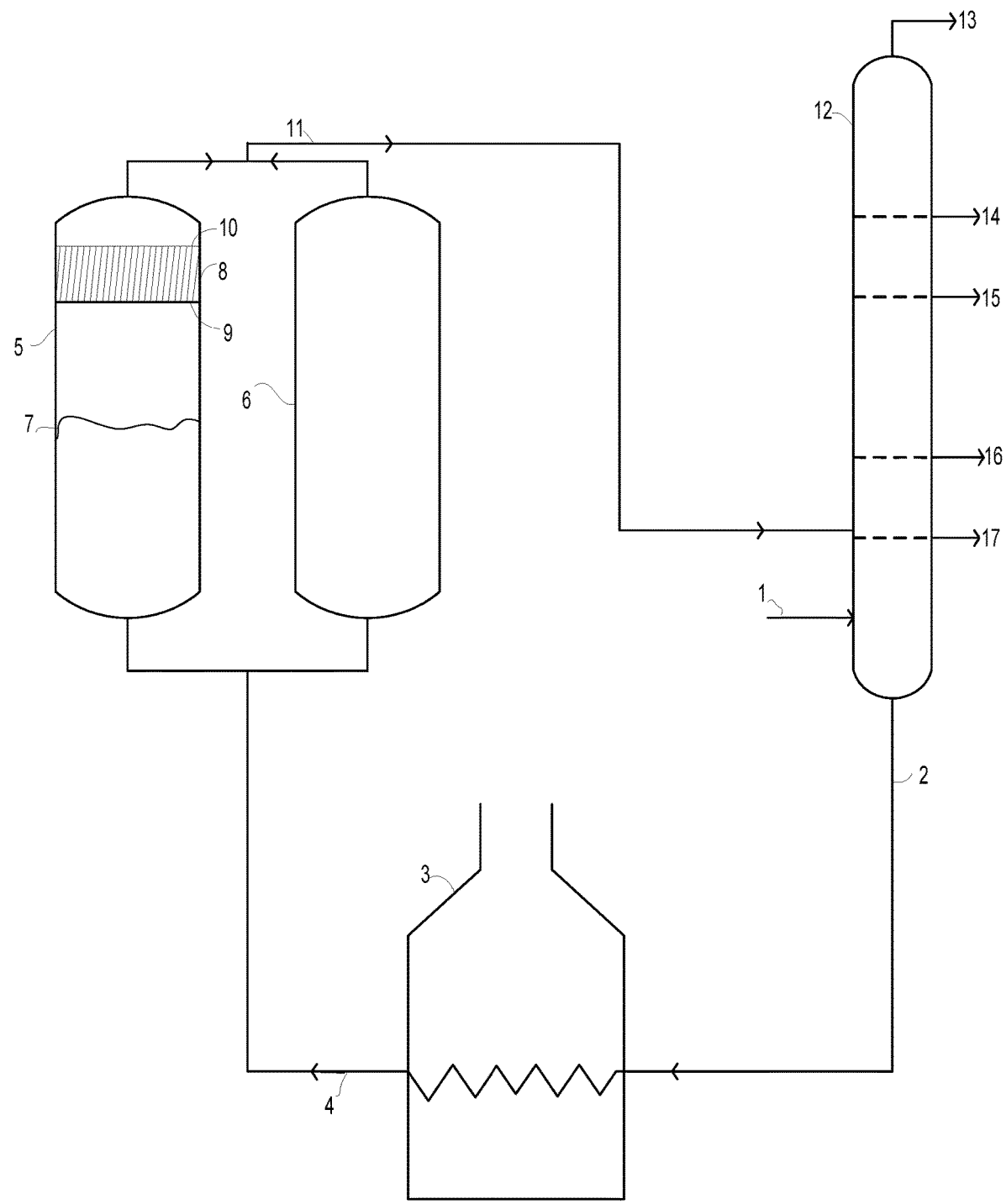
FIG. 2 describes the schematic-diagram of an implementation of present subject matter, in accordance with an embodiment.

A schematic implementation of the present subject matter is provided through the apparatus as depicted in FIG. 2, wherein fresh feed (1) enters the bottom of the coker fractionator column (12) at the bottom section and mixes with the internal recycle stream, and exits the fractionator column at a higher temperature as the secondary feed stream (2). Secondary feed then enters the coker furnace (3), which is a fired process heater with fuel gas/natural gas and/or fuel oil firing, where the hydrocarbon feed stream gets heated to a pre-determined temperature, i.e. a desired coil outlet temperature. The hot secondary feed stream (4) exiting the coker-furnace is then sent to one of the coke drums (5) or delayed coker drums (5) in 'filling cycle' or 'feeding cycle' to trigger vapour production, as known to those well versed with the art of delayed coking process. Thermal cracking reactions take place inside the coke drum liquid pool (7) where the hydrocarbon feedstock gets converted to lighter hydrocarbon products like naphtha, fuel gas, LPG, middle distillates, fuel oil component etc. Solid petroleum coke is also generated, which gets deposited inside the coke drum, which is removed at the later stage by coke cutting process, when the feed is stopped and a series of activities like steaming, quenching etc. are carried out. Meanwhile, during the filling cycle, the whole product vapors generated in the coke drum liquid pool travel up the coke drum and are then contacted by a bed of catalyst material (8) kept near the exit of the coke drum. The catalyst bed is provided with means (9) to distribute the product vapors from below in a uniform manner and facilitate catalytic-cracking of the product-vapour. Since the product vapors carry thermal energy before entering the catalyst-bed, this energy combined with the catalytic effect of the material enables further catalytic cracking of the hydrocarbon product vapors to desired products. The catalyst bed is maintained till a particular/pre-determined level (10) or height, such that the catalyst particles are not carried over to the overhead vapor line (11) with the product vapors exiting the coke drum (5, 6).

Accordingly, the exit provided by the overhead vapor line provides a media to withdraw the vaporized hydrocarbon products formed within the coke drum (5, 6). The product-vapors after catalytic-cracking, i.e. cracked-vapors, are then routed to the coker fractionator column (12) for conversion into hydrocarbon products. The gaseous fraction along with light naphtha (13) is sent to the condensers where the naphtha fraction is separated. The remaining gases are then sent to the GASCON section for further recovery of fuel gas, LPG etc. the remaining liquid products are separated to kero (14), LCGO (15), HCGO (16), CFO (17) fractions, similar to conventional delayed coking process.

In the preparation of coke drum under maintenance, to switch to 'filling' mode, vapor heating of the drum is carried out to heat the drum to a pre-determined higher temperature. In an embodiment, a vapor inlet entry pipe to the wall of coke drums (6,7) is at an elevation below the catalyst bed bottom distributor (9), in order to facilitate the vapor heating operation of the coke drum, without having to contact with the catalyst bed.

Figure 3:
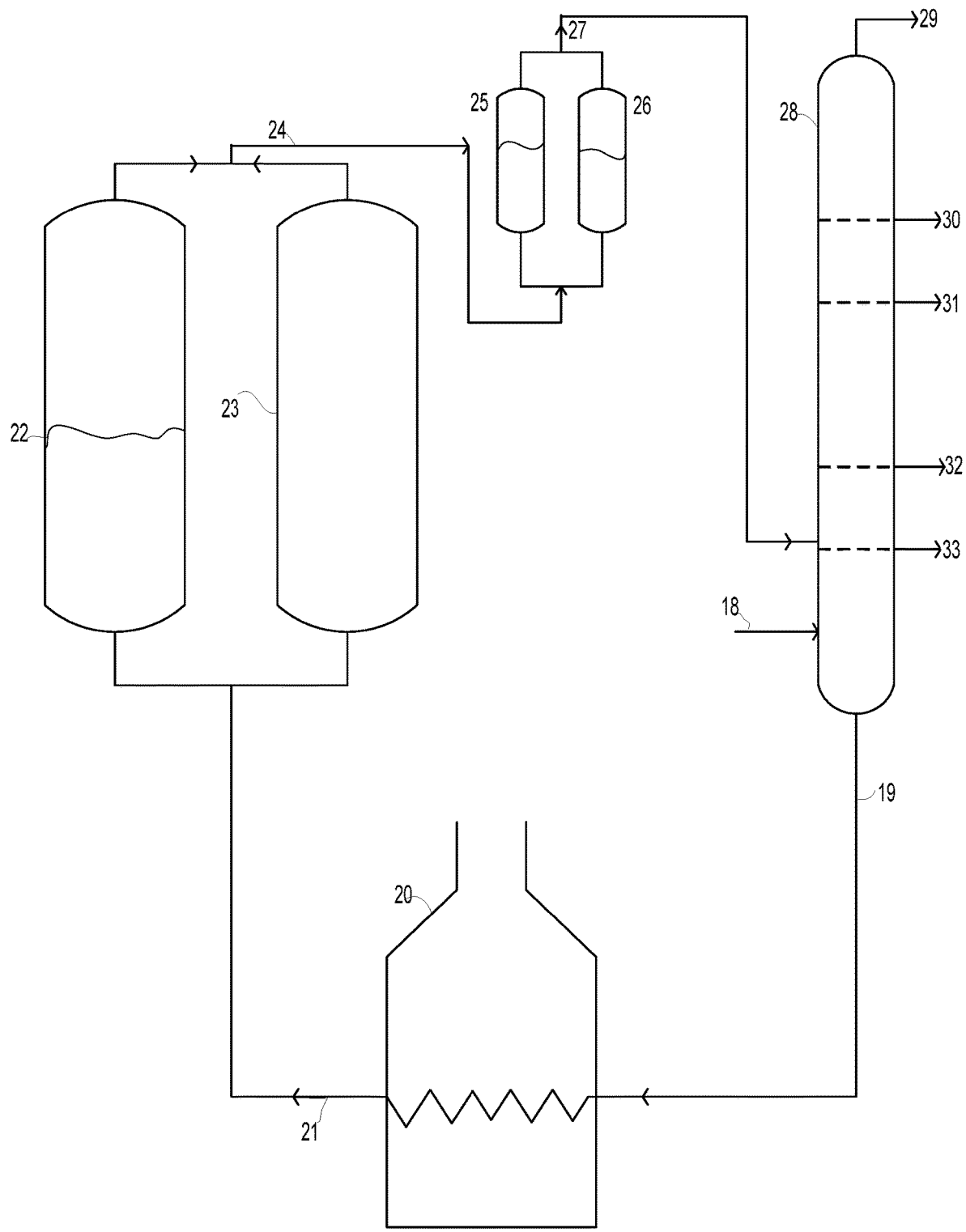
FIG. 3 describes the schematic-diagram of an implementation of present subject matter, in accordance with another embodiment.

Another schematic implementation of the present subject matter is provided as FIG. 3. Fresh feed (18) enters the bottom of the coker fractionator column (28) at the bottom section and mixes with the internal recycle stream and exits the fractionator column at a higher temperature as the secondary feed stream (19). Secondary feed then enters the coker furnace (20), which is a fired process heater with fuel gas/natural gas and/or fuel oil firing, where the hydrocarbon feed stream gets heated to the predetermined or desired coil outlet temperature. The hot secondary feed stream (21) exiting the coker furnace is then sent to one of the coke drums (22) in 'filling cycle' or 'feeding cycle' for triggering vapour production, as known to those well versed with the art of delayed coking process. Thermal cracking reactions take place inside the coke drum liquid pool where the hydrocarbon feedstock gets converted to lighter hydrocarbon products like naphtha, fuel gas, LPG, middle distillates, fuel oil component etc. Solid petroleum coke is also generated, which gets deposited inside the coke drum, which is removed at the later stage by coke cutting process, when the feed is stopped and a series of activities like steaming, quenching etc. are carried out. Meanwhile, during the filling cycle, the whole product vapors generated in the coke drum liquid pool travel up the coke drum and exit the coke drum through overhead vapor line (24). These vapors are then contacted by a bed of catalyst material kept in the reactor vessels (25 and 26) flow-connected to the coke-drums (22 and 23). The catalyst bed is provided with means to distribute the product vapors from below in a uniform manner to facilitate catalytic-cracking. Since the product vapors carry thermal energy before entering the catalyst bed, this energy combined with the catalytic effect of the material enables further catalytic cracking of the hydrocarbon product vapors to desired products. The catalyst bed is maintained till a particular level/height/limit within the reactor vessels (25 and 26) such that the catalyst particles are not carried over to the overhead vapor line with the product vapors exiting the reactor. The product vapors after catalytic cracking, i.e. cracked-vapors are then routed to the coker fractionator column (28). The gaseous fraction along with light naphtha (29) is sent to the condensers where the naphtha fraction is separated. The remaining gases are then sent to the GAS-CON section for further recovery of fuel gas, LPG etc. the remaining liquid products are separated to kero (30), LCGO (31), HCGO (32), CFO (33) fractions, similar to conventional delayed coking process.

In another embodiment, the product vapors exiting the coke-drum (24) are contacted with the catalyst material in on one of the reactor beds 25 or 26 i.e. a first catalytic bed, while the catalytic material in the other reactor bed (i.e. a second catalytic bed) is getting regenerated by coke burning. In this case, provision will be provided to isolate the catalytic reactor-bed undergoing regeneration process, from the hydrocarbon vapors and the flue gas exiting the reactor bed will be routed elsewhere to a heat recovery section and vent as per good engineering practices. Accordingly, the first (25) and the second catalyst beds (26) receive said vaporized hydrocarbon products from the delayed coker drum (22, 23) over different-periods of time.

Figure 4:
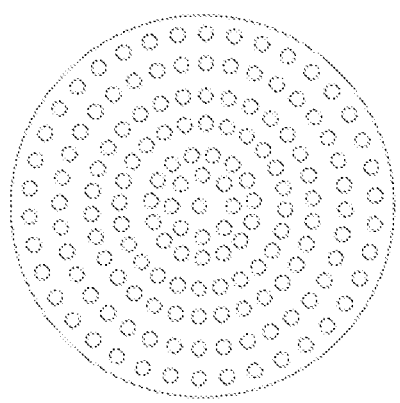
FIG. 4 describes exemplary distributor pates for the catalyst bed inside the coke drum.
Figure 4:
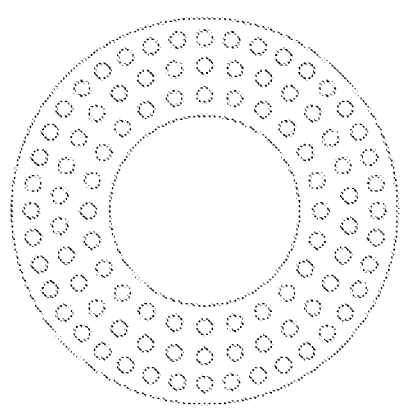

Examples of distributor plates which can be employed in the catalyst bed located inside the coke drum are provided in FIG. 4. It will be more efficient to contact the product vapors throughout the entire available cross sectional area of the coke drum using a distributor of type 3(a). The distributor of type 3(b) may be used with a matching annular catalyst bed inside the coke drum, if flexibility is required in terms of passage of coke cutting tool or for passage of product vapors during the vapor heating process which takes place as a preparation step prior to the start of filling cycle, as known to those with expertise in the art of Delayed coking process. The orifice sizes and numbers can be calculated according to standard engineering practice of distributor design, depending upon the total vapor flow, pressure drop across orifice etc.

Figure 5:
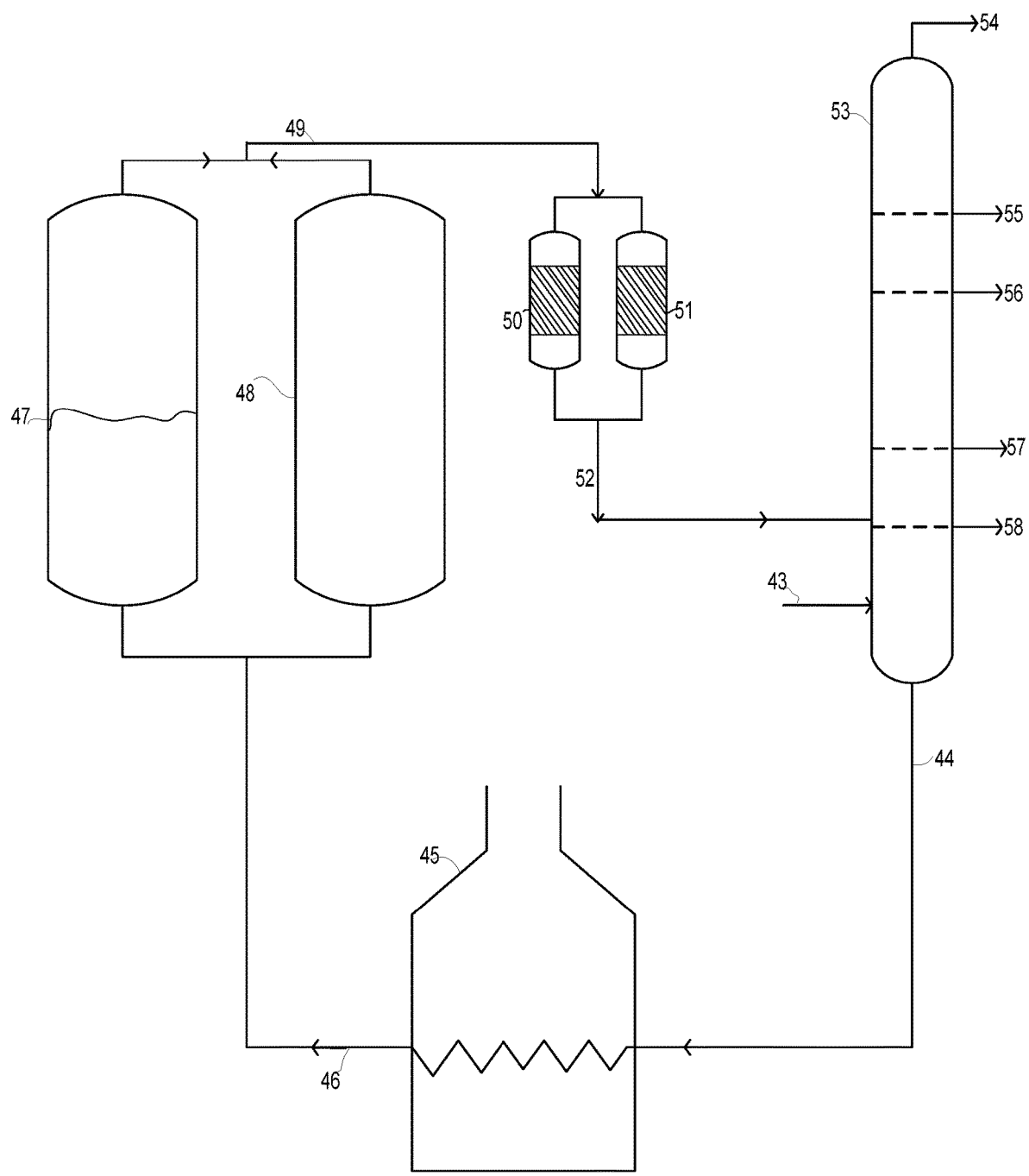
FIG. 5 describes the schematic-diagram of an implementation of present subject matter, in accordance with yet another embodiment.

Yet another implementation of the present subject matter is provided as FIG. 5. Fresh feed (43) enters the bottom of the coker fractionator column (53) at the bottom section and mixes with the internal recycle stream and exits the main fractionator column at a higher temperature as the secondary feed stream (44). Secondary feed then enters the coker-furnace (45), which is a fired process heater with fuel gas/natural gas and/or fuel oil firing, where the hydrocarbon feed stream gets heated to the pre-determined or desired coil outlet temperature. The hot secondary feed stream (46) exiting the coker-furnace is then sent to one of the coke drums (47) in 'filling cycle' or 'feeding cycle', as known to those well versed with the art of delayed coking process, to trigger vapour production. Thermal cracking reactions take place inside the coke drum liquid pool where the hydrocarbon feedstock gets converted to lighter hydrocarbon products like naphtha, fuel gas, LPG, middle distillates, fuel oil component etc. Solid petroleum coke is also generated, which gets deposited inside the coke drum, which is removed at the later stage by coke cutting process, when the feed is stopped and a series of activities like steaming, quenching etc. are carried out. Meanwhile, during the filling cycle, the whole product vapors generated in the coke drum liquid pool travel up the coke drum and exit/get withdrawn from the coke drum through overhead vapor line (49). These vapors are then contacted by a packed bed of catalyst material kept in the reactor vessels 50 and 51. The catalyst bed is provided with means to distribute the product vapors from top in a uniform manner to facilitate catalytic-cracking. Since the product vapors carry thermal energy before entering the catalyst bed, this energy combined with the catalytic-effect of the material enables further catalytic cracking of the hydrocarbon product vapors to desired products. The catalyst particle size as well as the bed height is maintained till a particular level such that the total bed pressure drop is minimum. The product vapors after catalytic cracking are then routed to the coker fractionator column (53). The gaseous fraction along with light naphtha (54) is sent to the condensers where the naphtha-fraction is separated. The remaining gases are then sent to the GASCON section for further recovery of fuel gas, LPG etc. the remaining liquid products are separated to kero (55), LCGO (56), HCGO (57), CFO (58) fractions, similar to conventional delayed coking process.

In another embodiment, the product vapors exiting the coke drum (47, 48) are contacted with the catalyst material in on one of the reactor beds (50 or 51) flow-connected to the coke-drum (47, 48), while the catalytic material in the other reactor bed (50 or 51) is getting regenerated by coke burning. Accordingly, the first (50) and the second catalyst beds (51) receive said vaporized hydrocarbon products from the delayed coker-drum (22, 23) over different-periods of time. In this case, provision will be provided to isolate the catalytic reactor bed undergoing regeneration process, from the hydrocarbon vapors and the flue gas exiting the reactor bed will be routed elsewhere to a heat recovery section and vent as per good engineering practices.

Figure 6:
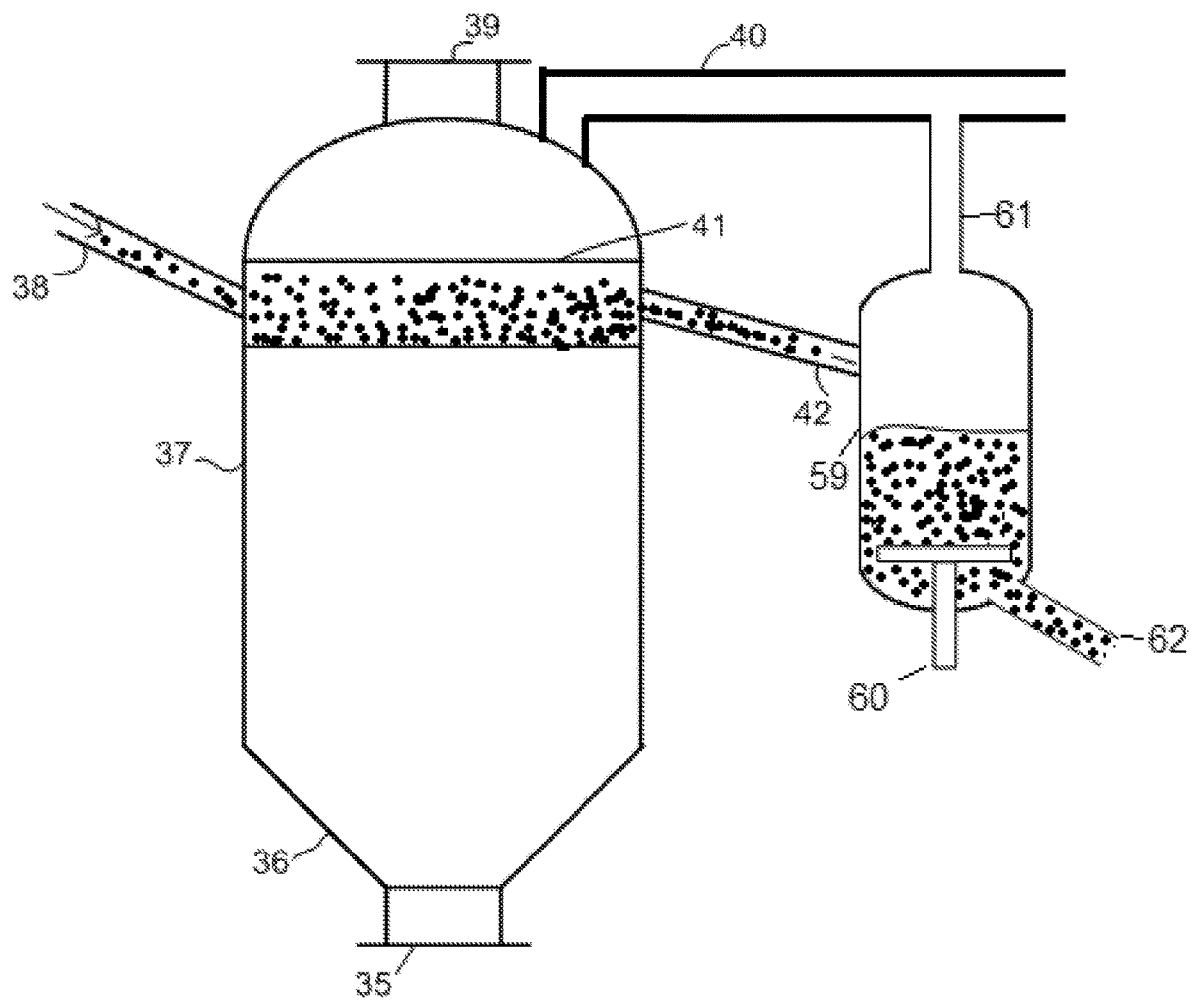
FIG. 6 describes the schematic-diagram of an implementation of present subject matter, in accordance with yet another embodiment.

Yet another embodiment of the subject matter is exemplified in FIG. 6. Here, the coke drum is shown in details like bottom flange (35), conical section (36), cylindrical section (37), top flange (39), overhead vapor line (40) etc. In this embodiment, instead of a static catalytic bed, moving bed (41) of catalysts with provision for continuous addition and withdrawal is envisaged. Active catalyst material can be supplied via a single or multiple inlets (38) into the catalyst bed and same can be withdrawn from the bed through single or multiple outlet means (42). The distributor and associated parts to maintain the bed can be either located permanently, in which case the bed may be an annular cross section with a distributor of design similar to that shown in FIG. 3(b), or it can be fixed during the drum preparation/maintenance cycle. A distributor design preferably similar to that shown in FIG. 3(a) can be also employed.

Another possible mechanism or device can be an insertable perforated plate which inserts into the coke drum with the movement of a stem, similar to a valve/blind system. Flow of catalyst may be established at the beginning of the hydrocarbon filling cycle of the drum and can be stopped at the end of the cycle. Catalyst addition and withdrawal rates may be adjusted so as to maintain a certain bed level and/or residence time inside the catalyst bed. The height of catalyst bed may be selected according to the desired vapor-catalyst contact time as well as the catalyst entrainment with the product vapors. The catalyst supply line (38) will be connected to a catalyst regeneration section, which ensures a continuous circulation of regenerated catalyst through the catalyst bed inside the coke drum, thereby leading to a circulating fluidized bed of catalysts. The catalyst withdrawal line (42) will be connected to a stripper vessel (59), where the entrained hydrocarbon vapors will be stripped out by contacting with an inert gas/vapor like steam which is supplied from bottom by means of a supply distributor (60). The hydrocarbon vapors along with the stripping vapors exits the stripper vessel (61) and joins the vapor line from coke drum (40). The stripped catalyst is then withdrawn from the stripper vessel by a withdrawal means (62) and is sent to the regenerator section, where it is regenerated by contacting with the air. The catalyst supply line (38) and the withdrawal line (62) will be connected to the common regenerator section.

In another embodiment, the catalyst may be supplied from a different location/vessel than the withdrawal section.

In a yet another embodiment, the fresh catalyst from silos of an existing FCC/RFCC unit may supply the catalyst to the catalyst bed and the catalyst withdrawn from the bed may be supplied back to the FCC/RFCC unit for loading into the unit. This scheme is having more workability in a refinery where FCC/RFCC unit is available in operation, thereby reducing the operating cost of the process of current subject matter.

Figure 7:
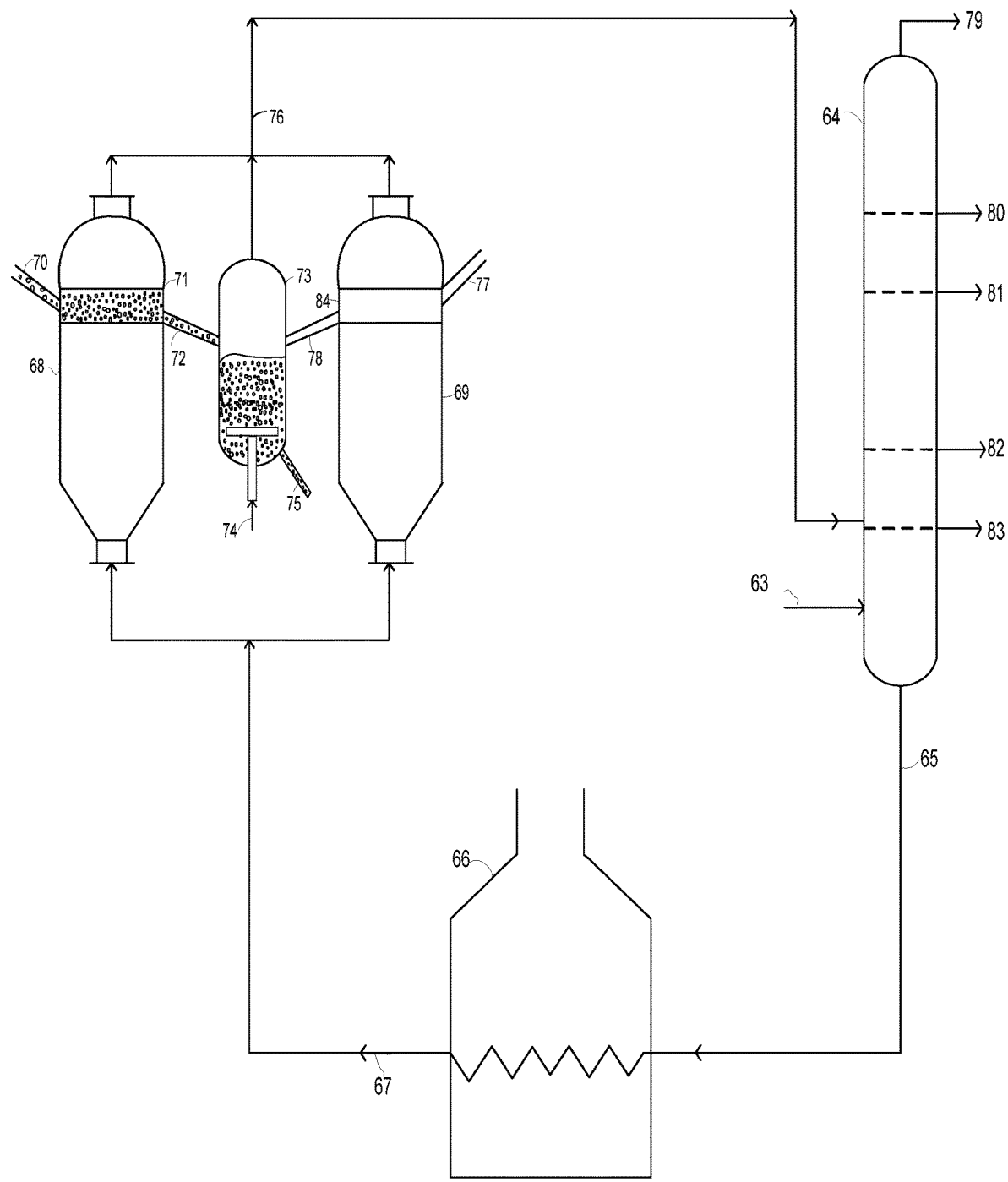
FIG. 7 describes the schematic-diagram of an implementation of present subject matter, in accordance with yet another embodiment.

A schematic of the embodiment of the subject matter of FIG. 6, used in a process scheme is depicted in FIG. 7. Fresh feed (63) enters the bottom of the coker fractionator column (64) at the bottom section and mixes with the internal recycle stream and exits the fractionator column at a higher temperature as the secondary feed stream (65). Secondary feed then enters the coker furnace (66), which is a fired process heater with fuel gas/natural gas and/or fuel oil firing, where the hydrocarbon feed stream gets heated to the predetermined temperature or a desired coil outlet temperature. The hot secondary feed stream (67) exiting the coker-furnace is then sent to one of the coke drums (68) in 'filling cycle' or 'feeding cycle' to trigger vapour production, as known to those well versed with the art of delayed coking process. Thermal cracking reactions take place inside the coke drum liquid pool where the hydrocarbon feedstock gets converted to lighter hydrocarbon products like naphtha, fuel gas, LPG, middle distillates, fuel oil component etc. Solid petroleum coke is also generated, which gets deposited inside the coke drum, which is removed at the later stage by coke cutting process, when the feed is stopped and a series of activities like steaming, quenching etc. are carried out. Meanwhile, during the filling cycle, the whole product vapors generated in the coke drum liquid pool travel up the coke drum and contacts the moving fluidized catalyst bed (71) where it contacts with the catalyst material supplied to the moving bed through the inlet (70) and gets converted to lighter hydrocarbons. The products after conversion exit (or get withdrawn from) the coke drum through overhead vapor line (76). The catalyst exiting the moving bed through the withdrawal line (72) or the spent catalyst is sent to a stripper vessel (73) where it is stripped off the entrained/entrapped hydrocarbons by contacting with a stripping steam (74). The vapors exiting the stripper vessel is also joined with the overhead product vapor line (76). The stripped catalyst or the spent catalyst from the stripper vessel (73) exits the stripper through a withdrawal line (75) and sent to a regeneration section, where it can/will be regenerated by burning off any deposited coke, in presence of air. As depicted in FIG. 6, there can be a common stripper vessel for handling the catalyst exiting the moving bed. There will be mechanisms like 'slide valves' for controlling the flow of catalyst through the catalyst supply (70, 77) and/or withdrawal lines (72, 78).

In the beginning of the filling cycle of a particular drum, the slide valves in the catalyst supply and withdrawal lines will be opened and a continuous-flow of catalyst will be established in the said drum. On completion of the filling cycle of the drum, said valves will close in such a manner that the catalyst is completely withdrawn from the moving bed and supply of catalyst is stopped. The porous support holding the moving bed can be retracted out of the coke drum in a manner described before, to facilitate the activities during maintenance cycle.

In an embodiment, there can be separate stripper and regeneration sections attached to separate coke drums.

In an embodiment, the porous plate support of the moving med may be fixed inside the coke drum permanently.

In an embodiment, the porous plate support of the moving bed can be made retractable out of coke drum, without compromising the safety aspects.

In yet another embodiment, the porous support plate for the moving bed may be positioned at an angle to the horizontal plane to facilitate the smooth movement of the catalyst through the bed. The angle of inclination can be selected taking into consideration, the angle of repose and angle of internal friction for the catalyst on the moving bed.

In another embodiment, the catalyst exiting the stripper vessel may be re-circulated to the moving bed inside the coke drum, without subjecting to regeneration.

EXPERIMENTAL RESULTS

As an exemplary embodiment two experiments were performed in a Delayed coker pilot plant using vacuum column bottom (VR), one without using any catalyst bed and a second experiment using the catalyst bed. The operating conditions for both the experiments were: 495° C. feed furnace outlet line temperature, 1.05 Kg/cm$^2$ (g) coke drum pressure, 1 wt % steam addition to the coker feed and a feed rate maintained at about 8 kg/h. The delayed coking pilot plant unit was operated on 16 hr cycle time, of which 12 hrs of the cycle consisted of feeding the unit with resid feed and 4 hrs of the cycle consisted of stripping and quenching.

In the experiment with catalyst bed, the catalyst mixture containing BCA and Y-zeolite in the ratio 1:1 was loaded into a bed with distributor located in the top section of the coke drum. The particles of additive material used had an average sphericity of 0.95 and the particle size and density was selected so as to prevent the entrainment of the same. The vapors emerging from the coking drums were fed into a fractionator and recovered as liquid and gas products in product collection vessels. No coker product was recycled to the coker drum. One repeat run was conducted to confirm the yield data obtained with the use of catalyst. The product yields obtained from the experiments are given in Table-1.

TABLE 1

Yields with the use of catalyst bed inside coke drum

| Yield (Basis: fresh feed) | VR without catalyst bed | VR with catalyst bed |
| --- | --- | --- |
| $H_2 + C_1 + C_2$ (Dry gas) (wt %) | 4.02 | 10.25 |
| LPG (wt %) | 3.06 | 9.35 |
| $C_5$-150 (Naphtha) (wt %) | 7.01 | 8.22 |
| 150-350 (Gas Oil) (wt %) | 28.19 | 26.46 |
| 350+ (Fuel Oil) (wt %) | 29.54 | 17.47 |
| Coke (wt %) | 28.18 | 28.25 |

The experimental data reported in Table-1 show that with use of catalyst bed, the yield of fuel gas and LPG fractions have increased by more than 6 wt % each. There is a considerable decrease in the liquid product boiling above 350° C., which forms the fuel oil part by the order of 11 wt %. Coke yield remained only marginally higher. This data indicates that the catalyst bed located inside the coke drum has facilitated the cracking of heavier hydrocarbon molecules boiling above 350° C. into smaller molecules, thereby adding the value to coking process. Additional advantages obtained from the process include no detrimental effect on coke quality, since the catalyst is not deposited in the coke bed inside the drum.

The present subject matter as relating to delayed coking of heavy petroleum residue produces petroleum-coke and lighter hydrocarbon products. The present subject matter utilizes an in-situ catalytic reactor bed as a part of the Delayed Coker-drum for catalytic cracking of the product vapors generated from the thermal-cracking reactions in the liquid pool inside the coke-drum, resulting in further conversion of the product vapors to lighter hydrocarbons, thereby reducing the yield of fuel oil and increasing the yield of LPG and fuel gas.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The scope of embodiments is by no means limited by these specific examples. Numerous variations, whether explicitly given in the specification or not, such as differences in structure, dimension, and use of material, are possible.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A delayed coker-drum comprising;
   a catalyst bed located within and at about an exit of the delayed coker-drum for contacting vaporized hydrocarbon products to trigger catalytic cracking;
   wherein said vaporized hydrocarbon products are generated from thermal cracking of a hydrocarbon-feed stream inside the delayed coker-drum.

2. The delayed coker-drum as claimed in claim 1, further comprising:
   an overhead vapour line connected to said bed to transfer vaporized hydrocarbon products to a coker-fractionator column;
   wherein said vaporized hydrocarbon products are generated inside the delayed coker-drum from thermal cracking followed by catalytic cracking reaction.

3. A system comprising:
   a delayed-coker drum producing vaporized hydrocarbon products resulting through thermal cracking of a hydrocarbon-feed stream;
   a catalyst bed flow-connected to the delayed coker-drum for contacting said vaporized hydrocarbon products to trigger cracking; and
   an additional catalyst bed flow connected to the delayed coker drum for receiving said vaporized hydrocarbon products;
   wherein said at least two catalyst-beds receiving said vaporized hydrocarbon products from the delayed coker drum over different period of time.

4. The system as claimed in claim 3, further comprising a coker-fractionator column for converting cracked vapour received from at least one of said catalyst-bed into one or more hydrocarbon products.

5. A system comprising;
   a delayed coker drum;
   a moving catalyst bed located within and at about an exit of the delayed coker drum for contacting vapour products generated in the coker-drum and withdrawing vaporized hydrocarbon products formed therein;
   a stripper vessel connected to said catalyst bed for removing the entrained hydrocarbons within a spent-catalyst; and
   a regenerator connected to said stripper vessel for regenerating the received spent catalyst and further connected to the moving catalyst bed for providing the regenerated catalyst.

* * * * *